US010460037B2

(12) United States Patent
Zelenkov

(10) Patent No.: US 10,460,037 B2
(45) Date of Patent: Oct. 29, 2019

(54) METHOD AND SYSTEM OF AUTOMATIC GENERATION OF THESAURUS

(71) Applicant: YANDEX EUROPE AG, Lucerne (CH)

(72) Inventor: Yury Grigorievich Zelenkov, Orekhovo-Zuevo (RU)

(73) Assignee: YANDEX EUROPE AG, Lucerne (CH)

( * ) Notice: Subject to any disclaimer, the term of this patent is extended or adjusted under 35 U.S.C. 154(b) by 98 days.

(21) Appl. No.: 15/606,162

(22) Filed: May 26, 2017

(65) Prior Publication Data

US 2018/0081874 A1 Mar. 22, 2018

(30) Foreign Application Priority Data

Sep. 20, 2016 (RU) .............................. 2016137530

(51) Int. Cl.
*G06F 17/27* (2006.01)
(52) U.S. Cl.
CPC ........ *G06F 17/2795* (2013.01); *G06F 17/274* (2013.01); *G06F 17/2705* (2013.01); *G06F 17/277* (2013.01); *G06F 17/2785* (2013.01)
(58) Field of Classification Search
None
See application file for complete search history.

(56) References Cited

U.S. PATENT DOCUMENTS

| 5,128,865 A | 7/1992 | Sadler |
| 6,519,586 B2 | 2/2003 | Anick et al. |
| 7,890,521 B1 | 2/2011 | Grushetskyy et al. |
| 9,158,841 B2 | 10/2015 | Hu et al. |
| 2004/0034649 A1* | 2/2004 | Czarnecki ............ G06F 16/951 |

(Continued)

FOREIGN PATENT DOCUMENTS

RU 2487403 C1 7/2013

OTHER PUBLICATIONS

Bessmertniy, "Method of Automatic Construction of Thesauruses Based on the Statistical Treatment of Texts on Natural Language", St. Petersburg National Research University of Information Technologies, Mechanics and Optics, * East Kazakhstan State Technical University, pp. 125-130.

(Continued)

*Primary Examiner* — Richa Mishra
(74) *Attorney, Agent, or Firm* — BCF LLP

(57) ABSTRACT

A method of automatic generation of a digital thesaurus, the method comprising: parsing the digital text and determining a first lexical unit and a second lexical unit; for each entry of the first lexical unit: selecting n-number of sequential units adjacent to the first lexical unit; generating a first context parameter for the first lexical unit, the first context parameter comprising an indication of each unit of the n-number of sequential units and a frequency of co-occurrence of each unit with the first lexical unit in the digital text; for each entry of the second lexical: selecting, n-number of sequential units adjacent to the second lexical unit; generating a second context parameter; determining a lexical unit relation parameter for the first lexical unit and the second lexical unit by: an interrelation analysis and an analysis of entry co-occurrence.

16 Claims, 11 Drawing Sheets

(56) References Cited

U.S. PATENT DOCUMENTS

| | | | | |
|---|---|---|---|---|
| 2010/0198821 A1* | 8/2010 | Loritz | ................ | G06F 17/2795 |
| | | | | 707/728 |
| 2015/0046152 A1 | 2/2015 | Lee | | |
| 2016/0148096 A1* | 5/2016 | Bornea | ................ | G06F 16/285 |
| | | | | 706/55 |

OTHER PUBLICATIONS

"Automatic thesaurus generation", Cambridge University Press, 2008, retrieved on web on May 24, 2017, https://nlp.stanford.edu/IR-book/html/htmledition/automatic-thesaurus-generation-1.html.

Aitchison et al., "Thesaurus Construction and use: a practical manual", "Automatic approaches to thesaurus construction", https://books.google.ru/books?id=01aPAgAAQBAJ&pg=PA76&lpg=PA76&dq=automatic+generation+of+thesauri&source=bl&ots=L5UYeoLtOM&sig=AsCkuz6bMJxX7aBc_I0ZNu1shLg&hl=ru&sa=X&ved=0ahUKEwinIYeS8_7KAhWId5oKHQZqAPEQ6AElazAJ#v=onepage&q=automatic%20generation%20of%20thesauri&f=false.

Nugumanova et al., «Automatic generation of association thesaurus based on domain-specific text collection», 10th International academic conference, Vienna, Jun. 2014, ISBN 978-80-87927-02-1, IISES.

Search Report with regard to the counterpart patent application No. RU 2016137530 completed Apr. 10, 2018.

\* cited by examiner

METHOD AND SYSTEM OF AUTOMATIC GENERATION OF THESAURUS

CROSS-REFERENCE

The present application claims priority to Russian Patent Application No. 2016137530, filed Sep. 20, 2016, entitled "Method And System of Automatic Generation of Thesaurus" the entirety of which is incorporated herein.

TECHNICAL FIELD

The present technology relates to methods and systems for the automatic generation of a thesaurus.

BACKGROUND

With ever increasing amount of data stored at various servers, the task of efficient information retrieval becomes an ever-more imperative one. Taking the Internet as an example, there are millions and millions of resources available on the Internet and several search engines (such as, GOOGLE™, YAHOO!™, YANDEX™, BAIDU™, and the like) which aim to provide users with a convenient tool for finding relevant information that is responsive to a user's search intent.

A typical search engine server executes a crawling function. More specifically, the search engine executes a robot that "visits" various resources available on the Internet and indexes their content. Specific algorithms and schedules for the crawling robots vary, but on the high level, the main goal of the crawling operation is to (i) identify a particular resource on the Internet, (ii) identify key themes associated with the particular resource (themes being represented by key words and the like), and (iii) index the key themes to the particular resource.

Once a search query from the user is received by the search engine, the search engine identifies all the crawled resources that are potentially related to the user's search query. The search engine then executes a search ranker to rank the so-identified potentially relevant resources. The key goal of the search ranker is to organize the identified search results by placing the potentially most relevant search results at the top of the search engine results list.

A typical search query comprises a string of words typed by the user. However, users often fail to select the effective terms when typing the string of words. For example, an English gourmet lover desirous of expanding his culinary experience may enter the search query "Japanese gastropub in Montreal", whereas most of the relevant pages are indexed with the term "izakaya" rather than "gastropub". Thus, documents that satisfy the user's information needs may use different terms than the specific query terms used by the user.

Generally speaking, there exist a few types of computer-based approaches to modify/expand the query terms to better meet with the user's search intent. For example, a simple approach is to use a pre-constructed semantic database, such as a thesaurus database. However, the construction of the thesaurus database is expensive and is generally restricted to one language.

U.S. Pat. No. 7,890,521 discloses a system that automatically generates synonyms for words from documents. During operation, this system determines co-occurrence frequencies for pairs of words in the documents. The system also determines closeness scores for pairs of words in the documents, wherein a closeness score indicates whether a pair of words are located so close to each other that the words are likely to occur in the same sentence or phrase. Finally, the system determines whether pairs of words are synonyms based on the determined co-occurrence frequencies and the determined closeness scores. While making this determination, the system can additionally consider correlations between words in a title or an anchor of a document and words in the document as well as word-form scores for pairs of words in the documents.

U.S. Pat. No. 9,158,841 discloses a method of evaluating semantic differences between a first item in a first semantic space and a second item in a second semantic space. The method includes: calculating a first ordered list of N nearest neighbors of the first item within the first semantic space; calculating a second ordered list of N nearest neighbors of the second item within the second semantic space; and computing a plurality of similarity measures between the first n nearest neighbors of the first item and the first n nearest neighbors of the second item, wherein n and N are positive integers and $1 \leq n \leq N$.

US2015/0046152 discloses a method for generating a set of concept blocks, wherein the concept blocks are words in a corpus of documents that can be processed to extract trends, build an efficient inverted search index, or generate a summary report of the content. The method entails generating a plurality of target words from the corpus, determining context strings for the target words, obtaining pattern types that are based on number of words and position of words relative to the target words, and assigning weights to each of the context strings having a particular pattern type. The target words are then expressed as vectors that reflect the weights of the context strings. The vectors are compared and grouped into clusters based on similarity. Target words in the resulting clusters are concept blocks. A subgroup of clusters may be selected for another iteration of the process to catch new concept blocks.

SUMMARY

The present technology may ameliorate at least some deficiencies of the prior art with respect to the automatic generation of thesaurus.

In accordance with a first broad aspect of the present technology, there is provided a method of automatic generation of a digital thesaurus. The method is executable by a server coupled to a semantic relationship database. The method comprises: acquiring by the server, an indication of a digital text; parsing, by the server, the digital text and determining a first lexical unit and a second lexical unit; for each entry of the first lexical unit in the digital text: selecting, by the server, n-number of sequential units adjacent to the first lexical unit; generating, by the server, a first context parameter for the first lexical unit, the first context parameter comprising an indication of each unit of the n-number of sequential units and a frequency of co-occurrence of each unit with the first lexical unit in the digital text; for each entry of the second lexical unit in the digital text: selecting, by the server, n-number of sequential units adjacent to the second lexical unit; generating, by the server, a second context parameter for the second lexical unit, the second context parameter comprising an indication of each unit of the n-number of sequential units and a frequency of co-occurrence of each unit with the second lexical unit in the digital text; determining, by the server, a lexical unit relation parameter for the first lexical unit and the second lexical unit, the lexical unit relation parameter indicative of a semantic link between the first lexical unit and the second lexical unit, the lexical unit relation parameter being determined by: an interrelation analysis of the first context parameter and the second context parameter; an analysis of entry co-occurrence of the first lexical unit and the second lexical unit in the digital text; storing, by the server, the lexical unit relation parameter in the semantic relationship database.

In some implementations of the method, the indication of the digital text is received from a database comprising at least one digital training document.

In some implementations of the method, the method further comprises associating a grammatical type to each word of the digital text before determining the first lexical unit and the second lexical unit.

In some implementations of the method, the lexical unit is one of: a word the word being determined based on its associated grammatical type; and a phrase, the phrase being a group of two or more words determined based on the associated grammatical type of one of the two or more words.

In some implementations of the method, the method further comprises lemmatizing the first and second lexical units and the words of the digital text before determining the frequency of co-occurrence.

In some implementations of the method, the n-number of sequential units are at least one of sequentially preceding, sequentially following, or sequentially preceding and following the first and second lexical unit, respectively.

In some implementations of the method, upon determining that the n-number of sequential units adjacent to a given occurrence of the first lexical unit spans into an additional sentence adjacent thereto, generating a respective first context parameter associated with the given occurrence comprises using a subset of the n-number of sequential units, the subset being units from the sentence of the given occurrence.

In some implementations of the method, the n-number of sequential units are of a predetermined grammatical type.

In some implementations of the method, the analysis of entry co-occurrence comprises determining a co-occurrence parameter indicative of a frequency of the first lexical unit and the second lexical unit being contained within a given single sentence of the digital text.

In some implementations of the method, the interrelation analysis comprises determining a first similarity parameter between the first context parameter and the second context parameter.

In some implementations of the method, the interrelation analysis further comprises determining a first inclusion parameter indicative of the inclusion of the first context parameter into the second context parameter and a second inclusion parameter indicative of the inclusion of the second context parameter into the first context parameter.

In some implementations of the method, upon determination that the first inclusion parameter and the second inclusion parameter are bellow a first threshold, the lexical unit relation parameter for the first and second lexical unit is: indicative of a synonymous relationship if the first similarity parameter is above a second threshold and the co-occurrence parameter is below a third threshold; indicative of an antonymous relationship if the first similarity parameter is above a fourth threshold and the co-occurrence parameter is above a fifth threshold; and indicative of an associative link if the first similarity parameter is below a sixth threshold.

In some implementations of the method, the lexical unit relation parameter for the first and the second lexical unit is indicative of a hypernym-hyponym relationship if one of the first inclusion parameter or second inclusion parameter is above a threshold.

In some implementations of the method, the interrelation analysis further comprises: determining a first inclusion parameter of the first context parameter into the second context parameter; determining a second inclusion parameter of the first context parameter into a third context parameter, wherein the third context parameter is determined by: further parsing the digital text, by the server, to determine a third lexical unit; for each entry of the third lexical unit in the digital text: selecting, by the server, n-number of sequential units adjacent to the third lexical unit; generating, by the server, the third context parameter for the third lexical unit, the third context parameter comprising an indication of each unit of the n-number of sequential units and a frequency of co-occurrence of the each word with the third lexical unit in the digital text; and determining a second similarity parameter of the third context parameter with the second context parameter.

In some implementations of the method, the lexical unit relation parameter for the first, the second and third lexical unit is indicative of a holonym-meronym relationship if the first inclusion parameter and the second inclusion parameter is above a first threshold, and the second similarity parameter is below a second threshold.

In some implementations of the method, the parsing the digital text to determine the first lexical unit and the second lexical unit comprises splitting the digital text into a plurality of sentences.

In some implementations of the method, the server is a search engine server.

In some implementations of the method, the digital text is a web resource previously crawled by a crawler application.

In some implementations of the method, in response to a received search query, the search engine server is configured access the semantic relationship database and modify the search query to retrieve relevant web resources.

In the context of the present specification, unless expressly provided otherwise, an "electronic device", an "electronic device", a "server", a, "remote server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should also be noted that, unless otherwise explicitly specified herein, the drawings are not to scale.

DETAILED DESCRIPTION

Figure 1:
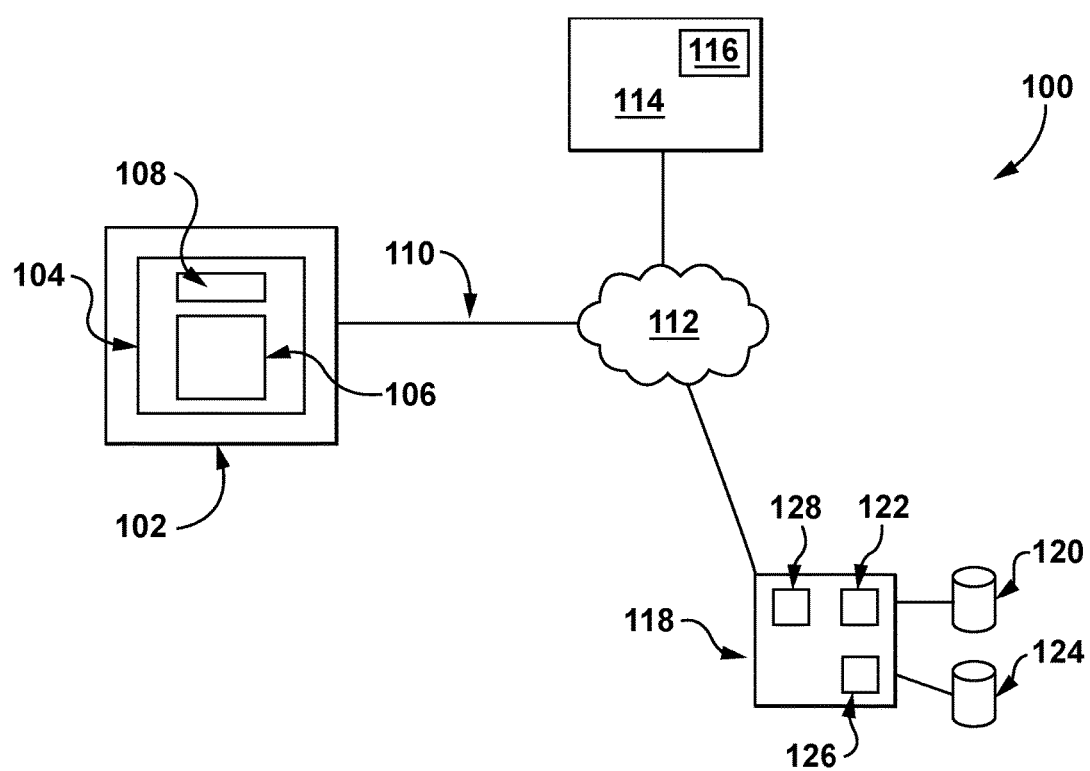
FIG. 1 depicts a system suitable for implementing embodiments of the present technology and/or being used in conjunction with implementations of the present technology.

Referring to FIG. 1, there is shown a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises an electronic device 102. The electronic device 102 is typically associated with a user (not depicted) and, as such, can sometimes be referred to as a "client device". It should be noted that the fact that the electronic device 102 is associated with the user does not mean to suggest or imply any mode of operation—such as a need to log in, a need to be registered or the like.

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 102 comprises hardware and/or software and/or firmware (or a combination thereof), as is known in the art to execute a search application 104. Generally speaking, the purpose of the search application 104 is to enable the user associated with the electronic device 102 to execute a web search. How the search application 104 is implemented is not particularly limited. One example of the search application 104 may be embodied in the user accessing a web site associated with a search engine to access the search application 104. For example, the search application 104 can be accessed by typing in an URL associated with Yandex™ search engine at www.yandex.com. It should be expressly understood that the search application 104 can be accessed using any other commercially available or proprietary search engine.

Generally speaking, the search application 104 comprises a web browser interface 106 and a query interface 108. The general purpose of the query interface 108 is to enable the user associated with the electronic device 102 to enter a search query or a "search string". The general purpose of the web browser interface 106 is to provide search results that are responsive to the search query entered into the query interface 108. How the search query is processed and how the search results are presented is described herein below.

The electronic device 102 is coupled to a communication network 112 via a communication link 110. In some non-limiting embodiments of the present technology, the communication network 112 can be implemented as the Internet. In other embodiments of the present technology, the communication network 112 can be implemented differently, such as any wide-area communication network, local-area communications network, a private communications network and the like.

How the communication link 110 is implemented is not particularly limited and will depend on how the electronic device 102 is implemented. Merely as an example and not as a limitation, in those embodiments of the present technology where the electronic device 102 is implemented as a wireless communication device (such as a smart phone), the communication link 110 can be implemented as a wireless communication link (such as, but not limited to, a 3G communications network link, a 4G communications network link, a Wireless Fidelity, or WiFi®, for short, Bluetooth®, or the like) or wired (such as an Ethernet based connection).

It should be expressly understood that implementations for the electronic device 102, the communication link 110 and the communication network 112 are provided for illustration purposes only. As such, those skilled in the art will easily appreciate other specific implementational details for the electronic device 102, the communication link 110, and the communication network 112. As such, by no means, examples provided hereinabove are meant to limit the scope of the present technology.

The system 100 further includes a server 114 coupled to the communication network 112. The server 114 can be implemented as a conventional computer server. In an example of an embodiment of the present technology, the server 114 can be implemented as a Dell™ PowerEdge™ Server running the Microsoft Windows Server™ operating system. Needless to say, the server 114 can be implemented in any other suitable hardware and/or software and/or firmware or a combination thereof. In the depicted non-limiting embodiment of the present technology, the server 114 is a single server. In alternative non-limiting embodiments of the present technology, the functionality of the server 114 may be distributed and may be implemented via multiple servers.

In some embodiments of the present technology, and generally speaking, the server 114 functions to serve as a repository for a network resource 116. In the context of the present specification, the term "network resource" refers to any web resource (such as a web page, a web site), which is presentable visually by the electronic device 102, associated with a particular web resource address (such as a Uniform Resource Locator (URL)). The network resource 116 comprises a digital text encoding natural language. For example, the digital text of the network resource 116 may be associated to, a news story, an encyclopedia entry, a magazine article, or any other text in natural language. The network resource 116 is accessible by the electronic device 102 via the communication network 112, for example, by means of the user typing in the URL in a browser application (not depicted) or executing a web search using the search application 104 on the electronic device 102. Although in the depicted non-limiting embodiment of the present technology, the server 114 hosts only the network resource 116, it is not limited as such and, may host a plurality of network resources.

Also coupled to the communication network 112 is a search engine server 118. Suffice it to say that the search engine server 118 can (but doesn't have to) be implemented in a similar manner to the server 114. In the depicted non-limiting embodiments of the present technology, the search engine server 118 is a single server. In alternative non-limiting embodiments of the present technology, the functionality of the search engine server 118 may be distributed and implemented via multiple servers.

The implementation of the search engine server 118 is well known. However, briefly speaking, the search engine server 118 comprises a communication interface (not depicted) structured and configured to communicate with various entities (such as the electronic device 102) via the communication network 112. The search engine server 118 further comprises at least one computer processor (not depicted) operationally connected with the communication interface, structured and configured to perform a predefined set of computer executable operations in response to receiving a corresponding computer readable code selected from a predefined native instruction set of codes stored in a memory (not depicted) in order to execute various processes described herein.

In some embodiments of the present technology, the search engine server 118 is under control and/or management of a search engine, such as that provided by YANDEX™ search engine of Yandex LLC of Lev Tolstoy Street, No. 16, Moscow, 119021, Russia. However, the search engine server 118 can be implemented differently (such as a local searcher and the like). The search engine server 118 is configured to maintain an index 120, which contains an indication of crawled network resources (such as network resource 116) accessible via the communication network 112.

The process of populating and maintaining the index 120 is generally known as "crawling" where a crawler application 122 executed by the search engine server 118 is configured to "visit" one or more network resources (such as the network resource 116) via the communication network 112 and to index the content thereof (such as associating a given web resource to one or more key words). In some embodiments of the present technology, the crawler application 122 maintains the index 120 as an "inverted index". Hence, the crawler application 122 of the search engine server 118 is configured to store information about such indexed network resources in the index 120.

The search engine server 118 is configured to maintain a semantic relationship database 124. In some embodiments of the present technology, the semantic relationship database 124 hosts a digital thesaurus (not depicted), the digital thesaurus being a repository of semantic relationships between words and/or phrases, as described below.

The populating and maintenance of the semantic relationship database 124 is executed by a text processing application 126. As described below in more detail, the text processing application 126 comprises a set of computer readable codes (as described above) executable by the processor (not depicted) of the search engine server 118, to perform the analysis of a digital text (described below) to automatically generate the digital thesaurus.

When the search engine server 118 receives the search query from the search application 104 (such as for example, "how to be a detail oriented patent drafter"), the search engine server 118 is configured to execute a ranking application 128. The ranking application 128 is configured to access the index 120 to retrieve an indication of the plurality of network resources (such as the network resource 116) that are potentially relevant to the submitted search query. In this example, the ranking application 128 is further configured to rank the so-retrieved potentially relevant network resources so that they can be presented in a ranked order on the Search Engine Results Page (SERP) on the web browser interface 106, such that the SERP presents so-ranked more relevant network resources at a top portion of the SERP.

In some embodiments of the present technology, the search engine server 118 is configured to modify the search query using the digital thesaurus hosted in the semantic relationship database 124. However, it should be understood that the application of the digital thesaurus hosted in the semantic relationship database 124 is not intended to be limited to generating search engine results. And, as such, the digital thesaurus hosted in the semantic relationship database 124 can be used for other purposes, such as for automatic translation of texts, presenting thesaurus information to a user for augmenting/changing text, and the like.

Generating the Digital Thesaurus

Figure 3:
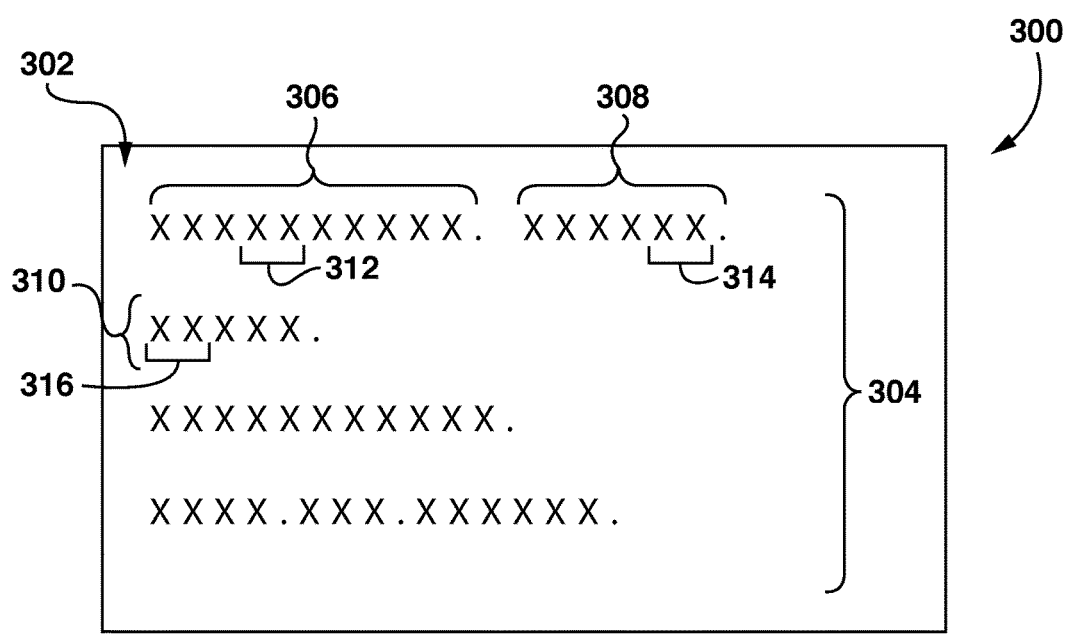
FIG. 3 depicts a screen shot showing a digital text, the digital text comprising a textual portion processed by the text processing application of FIG. 2.

FIG. 3 depicts a screenshot of a digital training document 300, the digital training document 300 including a digital text 302. In some embodiments, the digital training document 300 is a digital medium encoding natural language, such as the network resource 116 or other digital medium that can be used for the purpose of building the digital thesaurus.

The digital text 302 is made up of a plurality of sentences 304, the plurality of sentences 304 comprising a number of individual sentences, such as a first sentence 306, a second sentence 308, a third sentence 310. Although in the depicted illustration, the plurality of sentences 304 are separated by a full stop (i.e. a period), a person skilled in the art would understand that this is not always the case, and other punctuation marks, such as a question mark, an exclamation point may separate the plurality of sentences 304. The first sentence 306 comprises a first lexical unit 312, the second sentence 308 comprises a second lexical unit 314, and the third sentence 310 comprises a third lexical unit 316. For the avoidance of doubt, it should be mentioned here that the digital text 302 (and more specifically, each letter of the lexical units) is represented by an "X", however, in reality the individual lexical units are made of letters in a given language. For example, when the given language is English, the first sentence 306 can be: "Although not an athlete, the lawyer was having a leg day, as he was running away from all the deadlines".

In some embodiments of the present technology, the lexical units (the first lexical unit 312, the second lexical unit 314, and the third lexical unit 316) may be a word, the word being a smallest unit of speech that can stand by itself, or a phrase, the phrase being a meaningful entity comprising a group of two or more words (such as "modern computer systems", "information retrieval methods", "wooden chair", and the like), or a combination of both words and phrases.

Figure 2:
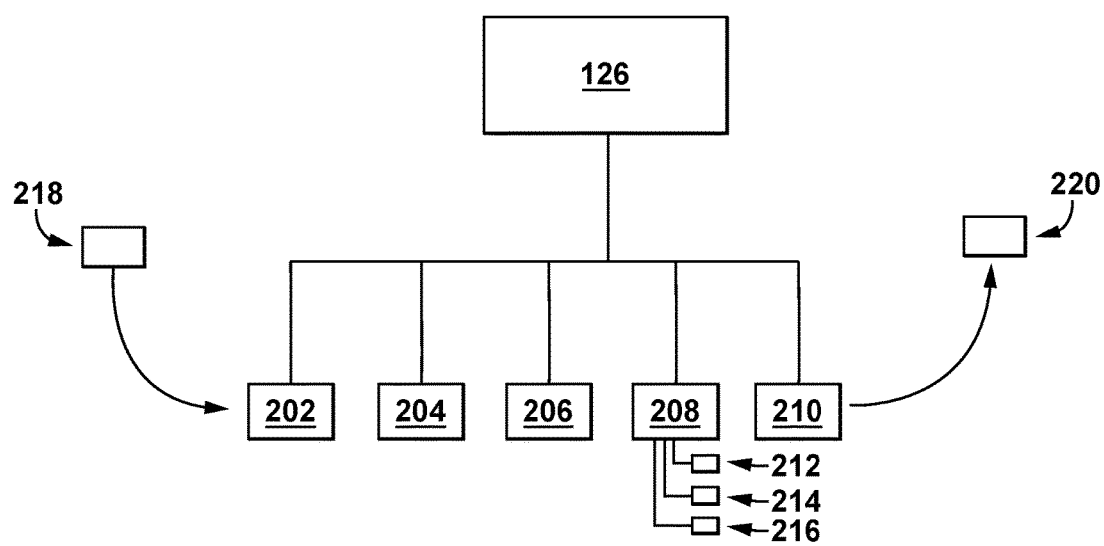
FIG. 2 depicts a schematic illustration of a text processing application of a search engine server of the system of FIG. 1.

Using an example of the digital text 302, functions and operations of the various components of the text processing application 126 will now be described in greater details. With reference to FIG. 2, there is depicted a schematic illustration of the text processing application 126 for automatically generating the digital thesaurus based on the digital text 302. The text processing application 126 executes (or otherwise has access to): a text acquiring routine 202, a parsing routine 204, a lexical unit determination routine 206, a context parameter generating routine 208, and a lexical unit relation generating routine 210.

In the context of the present specification the term "routine" refers to a subset of the computer readable codes of the text processing application 126 that is executable by the processor (not depicted) of the search engine server 118 to perform the functions explained below. For the avoidance of any doubt, it should be expressly understood that the text acquiring routine 202, the parsing routine 204, the lexical unit determination routine 206, the context parameter generating routine 208, and the lexical unit relation generating routine 210 are illustrated schematically herein in a separate and distributed manner for ease of explanation of the processes executed by the text processing application 126. It is contemplated that some or all of the text acquiring routine 202, the parsing routine 204, the lexical unit determination routine 206, the context parameter generating routine 208 and the lexical unit relation generating routine 210 may be implemented as one or more combined routines.

Functionalities of each one of the text acquiring routine 202, the parsing routine 204, the lexical unit determination routine 206, the context parameter generating routine 208 and the lexical unit relation generating routine 210, as well as data and/or information processed or stored therein is described below.

In accordance with embodiments of the present technology, the text acquiring routine 202 is configured to acquire a data packet 218 comprising an indication of the digital text 302 to be processed.

How the text acquiring routine 202 acquires the indication of the digital text 302 is not particularly limited. In some embodiments of the present technology, the data packet 218 comprising an indication of the digital text 302 is transmitted from a dedicated source (not depicted), such as a database comprising at least one digital training document.

Alternatively, in some embodiments of the present technology, the index 120 is configured to transmit the data packet 218 to the text acquiring routine 202. In such instance, the data packet 218 comprises an indication of the digital text 302, which is the textual portion of one or more crawled network resource.

The parsing routine 204 is configured to parse the plurality of sentences 304 into one or more individual sentences, such as the first sentence 306, the second sentence 308, and the third sentence 310. The manner in which the parsing is done is well known in the art and is not limited, and may be done by analyzing punctuation marks and applying grammatical rules. In some embodiments, the parsing routine 204 uses language-specific rules (i.e. rules specifically selected for the language of the digital text 302).

The lexical unit determination routine 206 tokenizes each word of the digital text 302 with an associated grammatical type (such as a noun, verb, etc.). The manner in which tokenization is done is well known in the art and is not limited, and may be done by analyzing the ending of surrounding words or the ending of the given word.

The lexical unit determination routine 206 is further configured to select the first lexical unit 312, the second lexical unit 314, and the third lexical unit 316.

As stated above, each lexical unit may be a word, or a phrase. The manner of identifying a given phrase is now described.

Figure 4:
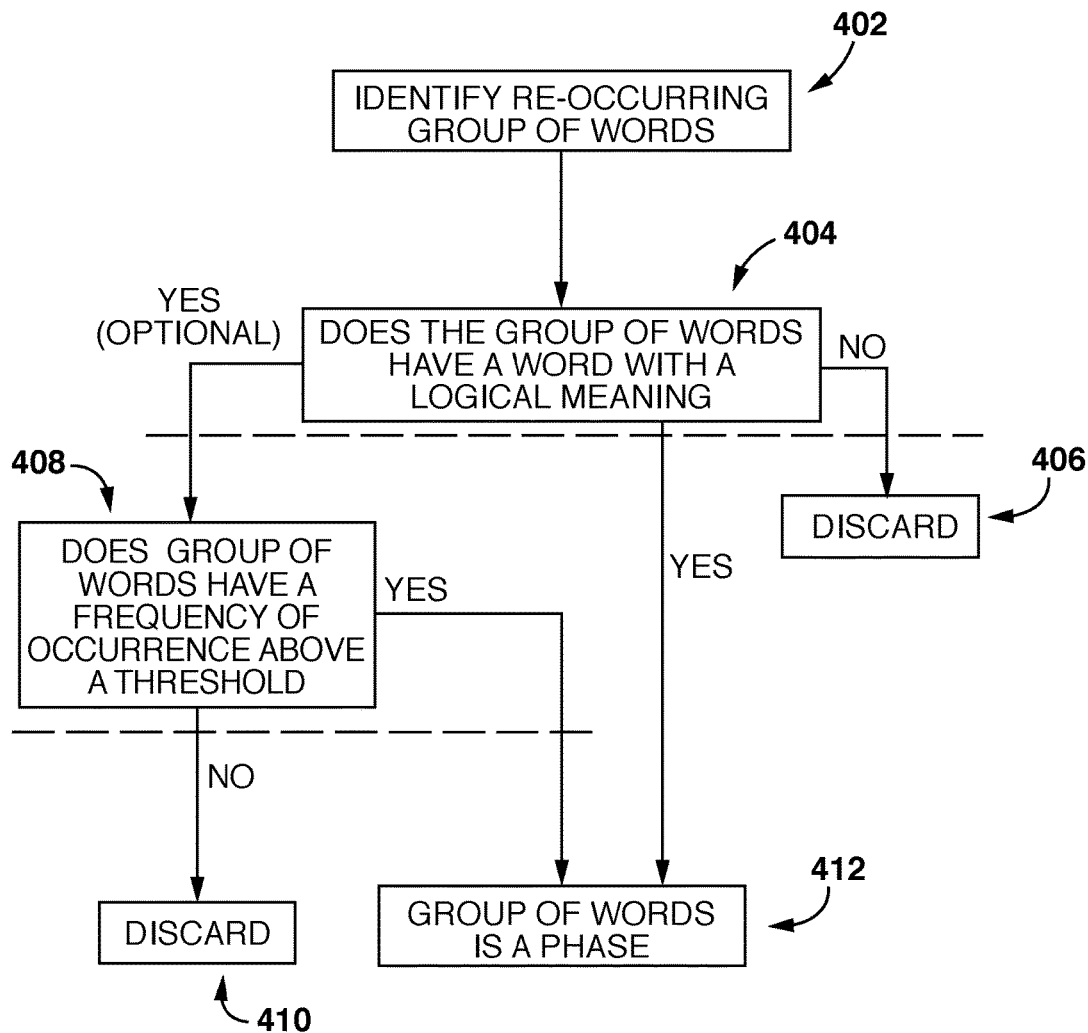
FIG. 4 depicts a first flowchart of identifying a phrase within the digital text of FIG. 3.

FIG. 4 illustrates an embodiment of a process for identifying a given phrase. At step 402, the lexical unit determination routine 206 is configured to analyze the digital text 302 and identify at least one group of words, each group of words comprising at least two words, re-occurring together in the digital text 302.

At step 404, for each identified group of words, the lexical unit determination routine 206 is configured to determine whether at least one word of the group of words has a logical meaning. In the context of the present technology, the terms "logical meaning" refer to the semantic conveyed by a lexical morpheme.

In some embodiments of the present technology, the lexical unit determination routine 206 is configured to determine if a given word of the group of words has a logical meaning based on the grammatical type of the given word. For example, the lexical unit determination routine 206 is configured to identify lexical morphemes such as verbs, adjectives, and adverbs, as having a logical meaning. On the other hand, words that are grammatical morphemes (which specify a relationship between other morphemes such as prepositions, articles, conjunctions, and the like) are considered as not having a logical meaning by the lexical unit determination routine 206.

Optionally, even if a given word of the group of words is determined to have a logical meaning, the lexical unit determination routine 206 is also configured to consider the given word as not having a logical meaning if it is determined that the given word is meaningless, unimportant, and/or noise-generating based on an empirical analysis, such as commonly re-occurring verbs such as "to be", "to have".

Following step 404, if there is at least one word having a logical meaning within the group of words, the method proceeds to step 412, where the lexical unit determination routine 206 is configured to identify the group of words as a phrase. On the other hand, if the identified group of words does not have at least one word with a logical meaning, the group of words is discarded at step 406.

Optionally, following step 404 and before proceeding directly to step 412, the lexical unit determination routine 206 is configured to calculate the frequency of entry of the given group of words within the digital text 302 at step 408. If the frequency of entry is below a pre-determined threshold (which may be empirically determined), the given group of words is discarded at step 410. If the given group of words has a frequency of entry above the pre-determined threshold, the method proceeds to step 412 where the lexical unit determination routine 206 is configured to identify the group of words as a phrase.

Figure 5:
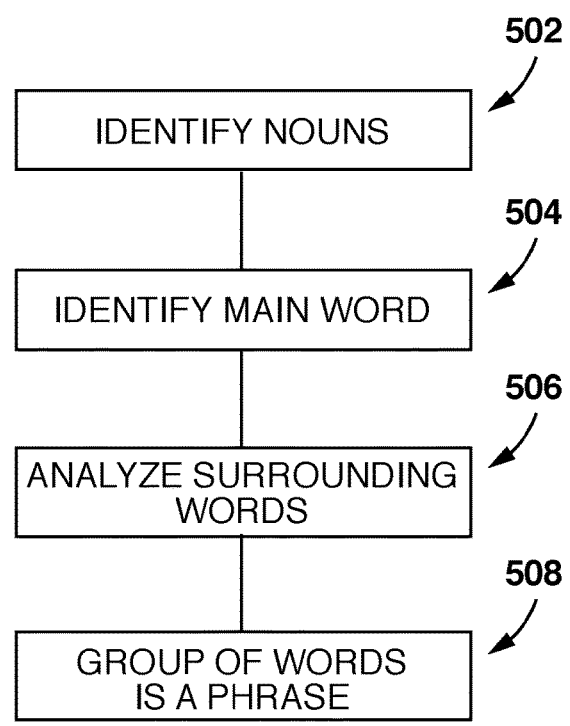
FIG. 5 depicts a second flowchart of identifying a phrase within the digital text of FIG. 3.

FIG. 5 illustrates another embodiment of a process for identifying a given phrase for the first sentence 306, which may read as "He sat on the wooden chair of the captain". At step 502 the lexical unit determination routine 206 is configured to analyze the sentence and identify the words previously tokenized as nouns (thus "chair" and "captain"). At step 504, the lexical unit determination routine 206 is configured to analyze the words identified as nouns and determine whether the words identified as nouns is a "trigger word", which is the main word of the phrase. Specific heuristic rules for identifying the trigger word vary (i.e. specific rules can be language-specific). In Russian language, the main word is typically the leftmost noun within the phrase. In English language, it may be the rightmost noun if there is no preposition such as "of", otherwise the leftmost noun before the preposition. Thus in the example provided, the word "chair" is considered by the lexical unit determination routine 206 to be the trigger word. At step 506, the lexical unit determination routine 206 is further configured to analyze the surrounding words of the trigger word and determine whether one or more surrounding words form a logical entity with the trigger word. For example, the lexical unit determination routine 206 may be configured to consider words of certain type, such as adjectives, nouns, and the like, placed next to the trigger word as forming a logical entity with the trigger word (ex. "wooden chair"). If it is determined that the one or more surrounding words form a logical entity with the trigger word, the one or more surrounding words and the trigger word are identified as a phrase at step 508.

Needless to say, other means of identifying a given phrase in the digital text 302 is known in the art and the processes and examples provided above are not meant to be limitative.

Once the one or more phrases have been identified using the non-limiting embodiments described above, the lexical unit determination routine 206 is configured to associate each identified phrase as a lexical unit. For example, if the lexical unit determination routine 206 has identified, within the digital text 302, 2 phrases, the lexical unit determination routine 206 will select the 2 phrases as the first lexical unit 312 and the second lexical unit 314.

Once the lexical unit determination routine 206 has selected one or more phrases as lexical units, it will select one or more words as lexical units. The manner of selecting a given word as the given lexical unit is now described.

In some embodiments, the lexical unit determination routine 206 is configured to exclude the previously identified phrases from the digital text 302 and identify the token of the remaining words of the digital text 302 and select a word that is one of a particular given grammatical type. In some embodiments, the lexical unit determination routine 206 is configured to select words having a logical meaning as described above (such as a verb, noun, or adjective, adverb, and the like, but not prepositions, conjunctions and the like).

In some embodiments of the present technology, the lexical unit determination routine 206 is further configured to analyze the selected one or more lexical units to determine if there is a lexical unit that is a homonym. For example, the word "bank" may have been selected as a lexical unit, although it may not be a priori known if the digital text 302 uses the word "bank" to refer to a financial institution or a slope immediately bordering a stream course along which the water normally runs. Naturally, it may be possible that the digital text 302 uses the word "bank" to refer to the financial institution in one instance thereof and the slope immediately bordering a stream course along which the water normally runs in a different instance thereof. The manner of determining a homonymy is not limited and may be done using known methods. If it is determined that a selected lexical unit that is a homonym used with more than one semantic within the digital text 302, the lexical unit determination routine 206 is configured to select the word (or a phrase) as two or more lexical unit. For example, following with the example of the word "bank", the word "bank" in the context of the financial institution is selected as a first lexical unit, and the word "bank" in the context of the slope bordering the stream course is selected as another lexical unit.

Once the first lexical unit 312, the second lexical unit 314 and the third lexical unit 316 have been selected, for each occurrence of the first lexical unit 312, the second lexical unit 314 and the third lexical unit 316 within the digital text 302, the lexical unit determination routine 206 is further configured to select n-number of sequential units adjacent to the respective first lexical unit 312, the second lexical unit 314 and the third lexical unit 316. In some embodiments of the present technology, the n-number of sequential units may sequentially precede and/or sequentially follow each of the first lexical unit 312, the second lexical unit 314 and the third lexical unit 316. The manner in which the number of words of the n-number of sequential units is determined is not limited. For example, the number of words of the n-number of sequential units may be pre-determined, and/or empirically determined.

For the purpose of illustration, and without the intention to be bound, let us consider the following example where:

The first sentence 306 reads as follows: "There are plenty of fishes swimming in the ocean";

The second sentence 308 reads as follows: "In the ocean, the whale shark is one of the largest fish";

The third sentence 310 reads as follows: "A whale shark is not a mammal that swims, unlike the whale";

The first lexical unit 312 selected is the word "fishes";

The second lexical unit 314 selected is the phrase "whale shark";

The third lexical unit 316 selected is the word "mammal";

The lexical unit determination routine 206 is configured to identify the 3 words sequentially preceding (the n-number of sequential units) and the 3 words sequentially following (the n-number of sequential units) each of the lexical units.

In some embodiments, the lexical unit determination routine 206 is configured to execute, upon identifying that the n-number of sequential units spans over a different sentence from the sentence with the entry of the given lexical unit, to identify only a subset of the n-number of sequential units, the subset being words/phrases of the n-number of sequential units contained within the given sentence.

In some embodiments, the lexical unit determination routine 206 is configured to lemmatize each selected lexical unit. For example, the first lexical unit 312 is transformed to "fish". In alternative embodiments, the lexical unit determination routine 206 is configured to lemmatize all the words of the digital text 302 to identify an occurrence of the given lemmatized lexical unit in the digital text 302.

The manner in which a given word is lemmatized is known in the art, but suffice to say that the lemmatization need not to use a dictionary, and may be done by stemming and analyzing the given word to generate a lemma of said given word, as is known in the art. Needless to say, the use of a dictionary is not excluded and may be used to improve the quality of the lemmatization.

The n-number of sequential units to the first lexical unit 312 in the first sentence 306 are "be" (lemma of "are"), "plenty", "of", "swim" (lemma of "swimming"), "in" and "the". The n-number of sequential units to the first lexical unit 312 in the second sentence 308 are "of", "the", and "large" (lemma of "largest").

The n-number of sequential units to the second lexical unit 314 in the second sentence 308 are "the", "ocean", "the", "be" (lemma of "is"), "one", and "of". The n-number of sequential units to the second lexical unit 314 in the third sentence are "a", "is" and "not".

The n-number of sequential units to the third lexical unit 316 are "is", "not", "a", "swim" (lemma of "swims"), "unlike", and "the".

Although in the example provided above, the number of words/phrases of the n-number of sequential units adjacent to each lexical unit was the same, it is not limited as such and may be different for each lexical unit.

In some embodiments of the present technology, when identifying the n-number of sequential units, the lexical unit determination routine 206 is configured to identify the n-number of sequential units that have a logical meaning (i.e. verbs, nouns, adverbs, adjectives, and the like) and discard sequential units without a logical meaning (such as, for example, pronouns, prepositions, conjunctions, and the like). Optionally, the lexical unit determination routine 206 is also configured to discard sequential units having a logical meaning that are occurring frequently (such as, the verbs "to be", "to have", units such as "one", and the like), when determining the n-number of sequential units.

In such a case, the n-number of sequential units to the first lexical unit 312 ("fish") in the first sentence 306 are the words "plenty", "swim" (lemma of "swimming") and "ocean". The n-number of sequential units to the first lexical unit 312 in the second sentence 308 comprises of the words "large" (lemma of "largest"), "ocean" and the phrase "whale shark".

The n-number of sequential units to the second lexical unit 314 ("whale shark") in the second sentence 308 are the words "ocean", "large" (lemma of "largest") and "fish". The n-number of sequential units to the second lexical unit 314 in the third sentence 310 are the words "mammal", "swim" (lemma of "swims") and "whale".

The n-number of sequential units to the third lexical unit 316 ("mammal") is the phrase "whale shark", the words "swim" (lemma of "swims") and "whale".

Returning to FIG. 2, once the n-number of sequential units for each lexical units have been identified, the context parameter generating routine 208 is configured to generate a first context parameter 212 for the first lexical unit 312, a second context parameter 214 for the second lexical unit 314, and a third context parameter 216 for the third lexical unit 316.

In the context of the present technology, the terms "context parameter" refer to an indication of each word/phrase of the n-number of sequential units and a frequency of co-occurrence with each entry of a given lexical unit in each of the plurality of sentences 304.

Figure 6:
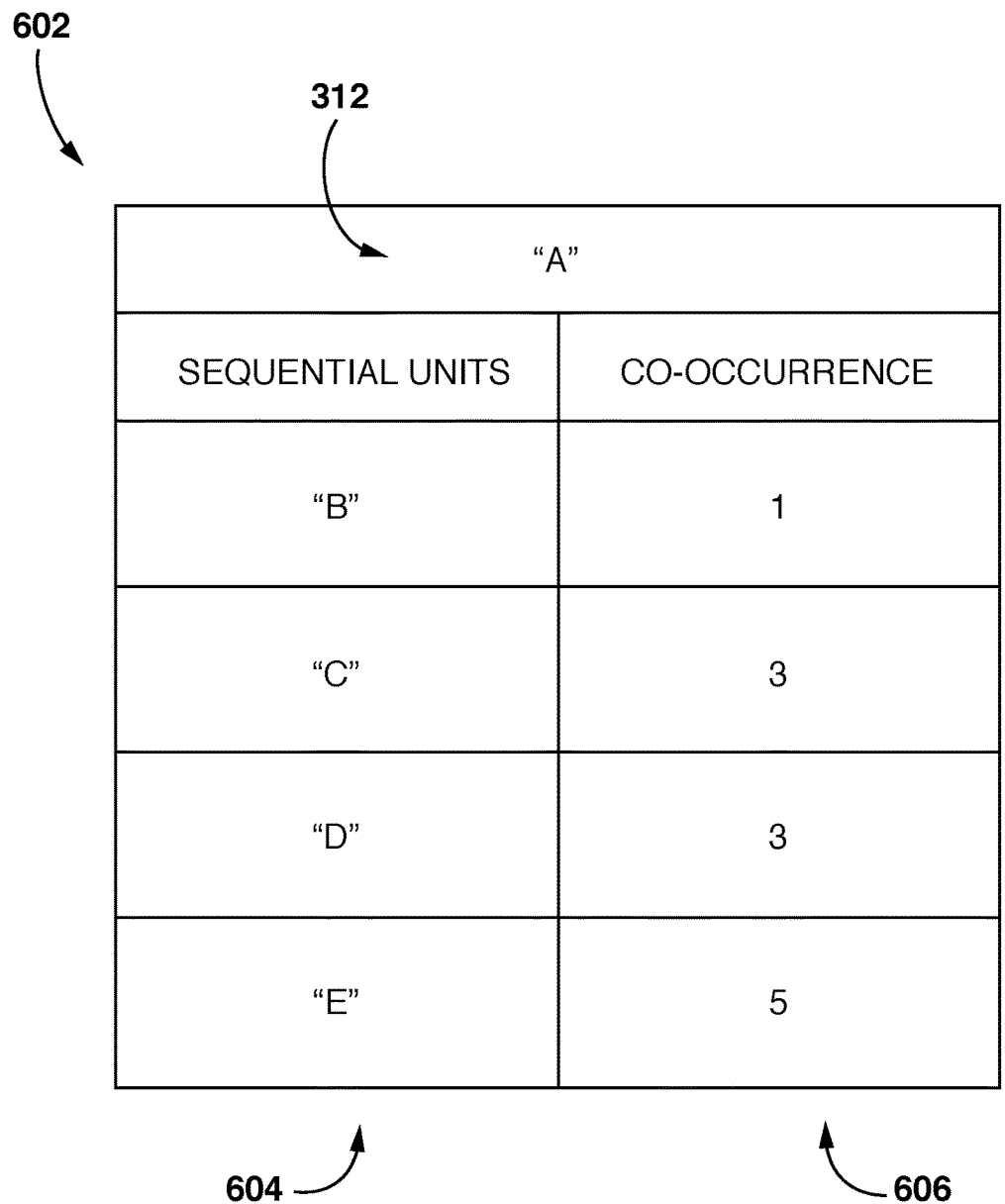
FIG. 6 depicts an example of a context parameter obtained for a lexical unit.

FIG. 6 illustrates a non-limiting example of a first context parameter 212 for the first lexical unit 312 (referred as word/phrase "A" for simplicity) in the form of a table list 602.

The table list 602 comprises a first column 604. Each entry of the first column 604 corresponds to each lemmatized n-number of sequential units of the lemmatized first lexical unit 312 (the units "B", "C", "D", and "E", which each may be one of a word or a phrase).

In some embodiments, the context parameter generating routine 208 is configured to form a unit-pair comprising the lemmatized first lexical unit 312 and each of the lemmatized n-number of sequential units in the first column 604, and identify the frequency of co-occurrence of each unit-pair where the first lexical unit 312 is an entry within the digital text 302. It should be recalled that the lexical unit determination routine 206 could have previously lemmatized all (or some) the words of the digital text 302 allowing a fast identification of the frequency of co-occurrence of each unit-pair.

For the avoidance of doubt, it should be mentioned here that although the digital text 302 of FIG. 3 illustrates a specific number of sentences, this is merely done so for ease of understanding. It should be expressly understood that the digital text 302 comprises more sentences than those depicted and the selected lexical units (the first lexical unit 312, the second lexical unit 314, and the third lexical unit 316) will appear many more times.

For example, in the provided illustration, within a second column 606, it is determined that the digital text 302 comprises only 1 sentence where the unit-pair "A-B" co-occurs. In another example, the unit-pair "A-E" co-occurs in 5 sentences.

Once the context parameters (the first context parameter 212, the second context parameter 214, the third context parameter 216) are determined, the lexical unit relation generating routine 210 is configured to execute, concurrently or sequentially: (i) an interrelation analysis of the first context parameter 212, the second context parameter 214, and the third context parameter 216; and (ii) an analysis of entry co-occurrence amongst the first lexical unit 312, the second lexical unit 314 and the third lexical unit 316 within the digital text 302.

Taking the example of the first lexical unit 312 and the second lexical unit 314, the analysis of entry co-occurrence comprises determining a co-occurrence parameter indicative of a frequency of the first lexical unit 312 and the second lexical unit 314 being contained within a given sentence of the digital text 302.

Within the context of the present technology, the terms "interrelation analysis" refer to determining (i) a relative similarity parameter amongst the first context parameter 212, the second context parameter 214, and the third context parameter 216, (ii) a relative inclusion parameter amongst two of the first context parameter 212, the second context parameter 214, and the third context parameter 216. An explanation and functionality of the similarity parameter, and the inclusion parameter is described below.

The Similarity Parameter

Figure 7:
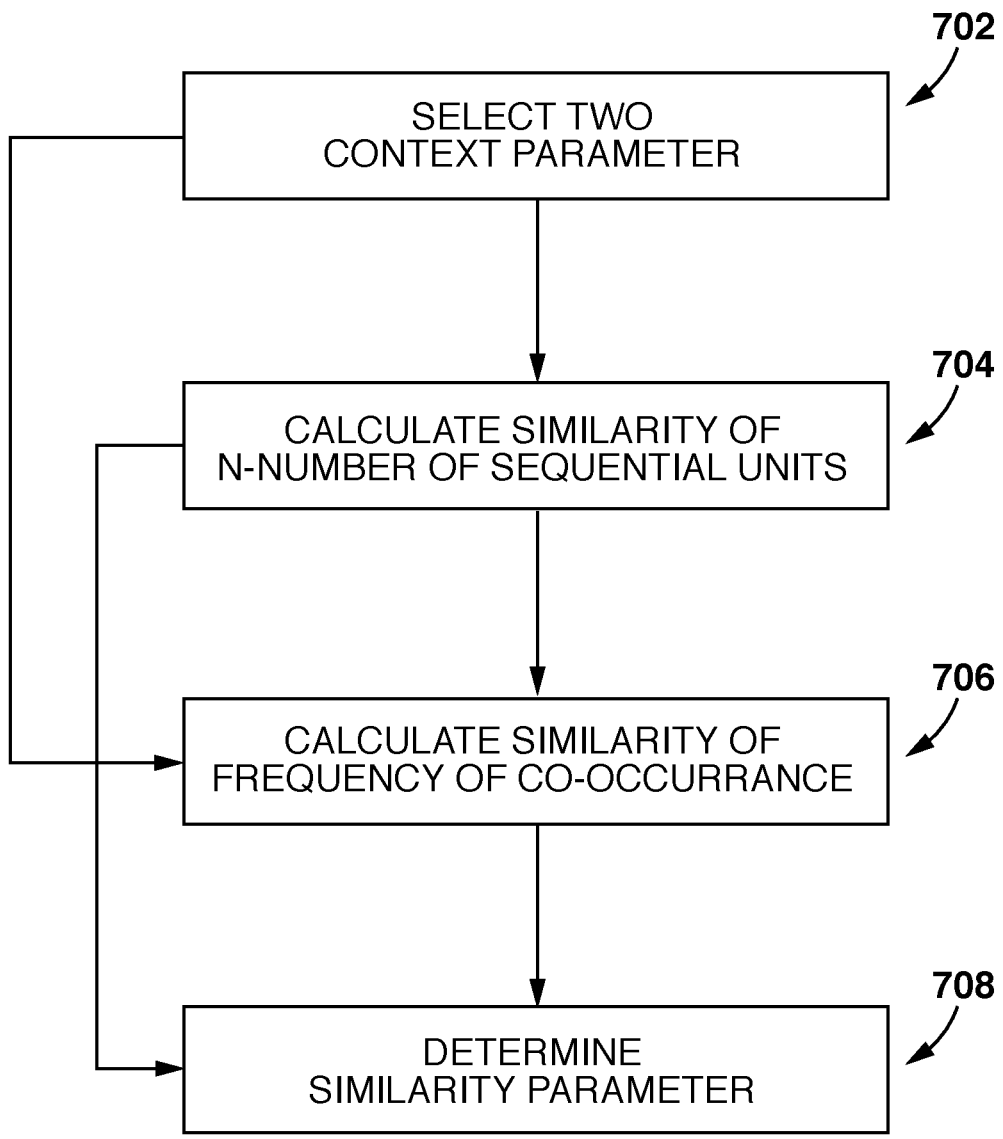
FIG. 7 depicts a flowchart of determining a similarity parameter between two lexical units using the context parameter of FIG. 6.

FIG. 7 illustrates a non-limiting embodiment of a process of determining the similarity parameter between the first context parameter 212 and the second context parameter 214 in accordance with some non-limiting embodiments of the present technology.

At step 702, the lexical unit relation generating routine 210 selects the first context parameter 212 and the second context parameter 214.

In some embodiment, at step 704, the lexical unit relation generating routine 210 is configured to calculate a first similarity parameter of the n-number of sequential units between the first context parameter 212 (i.e. the first column 604 of the table list 602) and the second context parameter 214. The manner in which the first similarity parameter is determined is not limited, and may be determined using known methods, such as the Sorensen-Dice coefficient. The determined first similarity parameter is considered as the similarity parameter between the first context parameter 212 and second the context parameter 214 at step 708.

Alternatively, instead of calculating the first similarity at step 704, the lexical unit relation generating routine 210 is configured to calculate a second similarity parameter at step 706, the second similarity parameter reflecting how each unit-pair and its frequency of co-occurrence are similar between the first context parameter 212 and the second context parameter 214. In other words, unlike the first similarity parameter which is the similarity of the n-number of sequential words, the second similarity parameter is the similarity of the unit-pairs of the context parameters and their frequency of co-occurrences. The manner in which the second similarity parameter is determined is not limited, and may be determined using known methods, such as the Spearman-Kendall rank correlation coefficient. The determined second similarity parameter is considered as the similarity parameter between the first context parameter 212 and the second context parameter 214 at step 708.

Optionally, the lexical unit relation generating routine 210 is configured to calculate the first similarity parameter at step 704 and the second similarity parameter at step 706, and calculate a third similarity parameter as the similarity parameter at step 708, the third similarity parameter being a product of the first similarity parameter and the second similarity parameter.

The Inclusion Parameter

Figure 8:
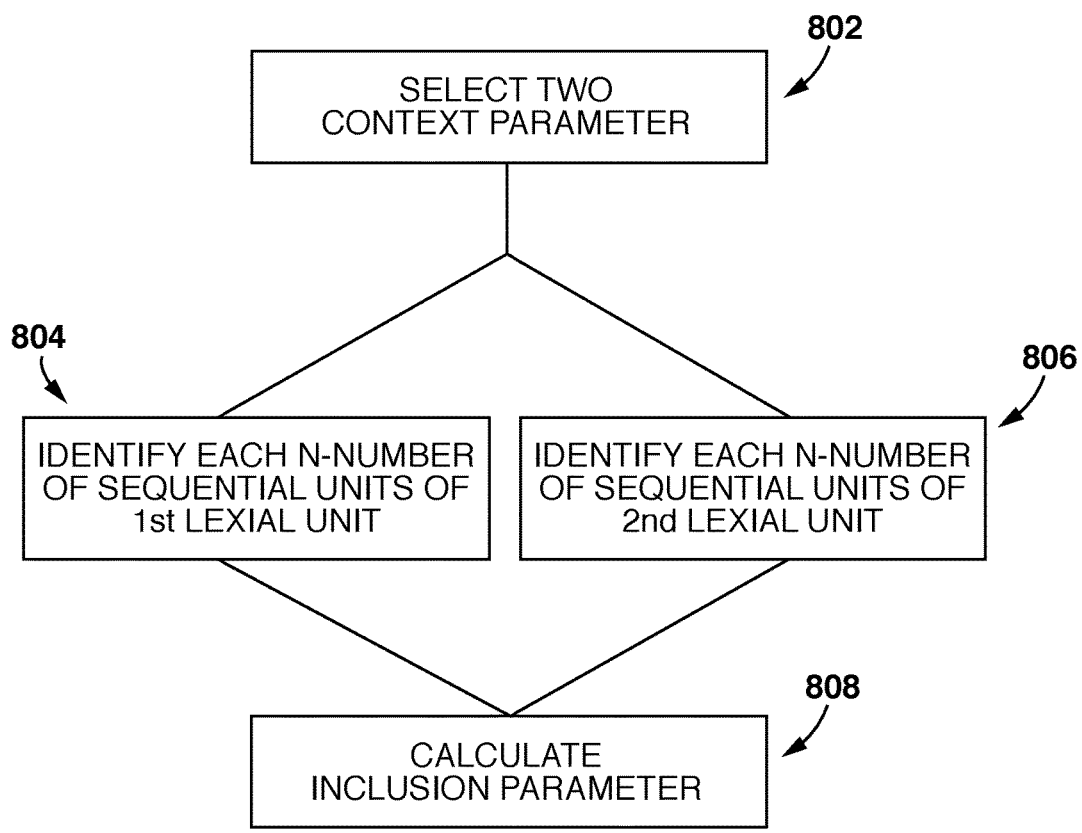
FIG. 8 depicts a flowchart of determining an inclusion parameter between two lexical units using the context parameter of FIG. 6.

FIG. 8 illustrates a non-limiting example of a process of determining the inclusion parameter of the first context parameter 212 into the second context parameter 214 according to some non-limiting embodiments of the present technology.

At step 802, the lexical unit relation generating routine 210 selects the first context parameter 212 and the second context parameter 214.

At step 804 the lexical unit generating routine 210 identifies each n-number of sequential units associated with the first lexical unit 312 (i.e. the first column 604 of the table list 602).

At step 806 the lexical unit generating routine 210 identifies each n-number of sequential units associated with the second lexical unit 314.

At step 808, the lexical unit generating routine 210 calculates the inclusion parameter. The manner in which the inclusion parameter is calculated is not limited, and may be determined by identifying the n-number of sequential units associated with the first lexical unit 314 included in the n-number of sequential units associated with the second lexical unit 316.

Embodiments of the present technology are based on developer's appreciation that two context parameters relate to each other the same way as their respective lexical units, and thus the semantic link between two lexical units can be determined by analyzing the relation between the respective context parameters. As such, the manner in which the semantic link is determined can be based on one or more heuristic rules.

Thus, in some embodiments of the present technology, once the interrelation analysis and the co-occurrence parameter have been respectively executed and calculated, the lexical unit relation generating routine 210 is configured to determine a lexical unit relation parameter indicative of a semantic link between two or more lexical units (such as the first lexical unit 312, the second lexical unit 314 and the third lexical unit 316). In some embodiments of the present technology, the semantic link may be one of a non-hierarchical link (being one of an associative link, synonymous relationship, or an antonymous relationship), a hierarchical link (being one of a hypernym-hyponym relationship, or a holonym-meronym relationship). In the context of the present technology, the terms "associative link" refer to the semantic link between two or more lexical units having an intersection in their meaning not amounting to a synonymous relationship.

Determining the Lexical Unit Relation Parameter

Explanation of determining the lexical unit parameter is now provided. For ease of understanding and for the avoidance of redundancy, the following explanation is provided with regards to the determination of the lexical unit relation of the parameter first lexical unit 312 in relation to other lexical units.

As a first step, the lexical unit relation generating routine 210 is configured to identify the remaining lexical units (thus, the second lexical unit 314 and the third lexical unit 316).

As a second step, the lexical unit relation generating routine 210 is configured to identify for each of the remaining lexical units, two inclusion parameters associated with the first lexical unit 312: namely, (i) the inclusion parameter of the first context parameter 212 into the given remaining lexical units; and (ii) the inclusion parameter of the given remaining lexical units into the first context parameter.

In some embodiments of the present technology, if both inclusion parameters are below a pre-determined threshold (which may be empirically determined), the lexical unit relation generating routine 210 is configured to execute a non-hierarchical link analysis with regards to the first lexical unit 312 and the lexical unit associated with the given inclusion parameters, as described below with reference to FIG. 9A.

Conversely, if one of the two inclusion parameters is above the pre-determined threshold, the lexical unit relation generating routine 210 is configured to execute a hierarchical link analysis with regards to the first lexical unit 312 and the lexical unit associated with the given inclusion parameters, as described below with reference to FIG. 9B.

For example, it may be determined that the inclusion parameter of the first context parameter 212 into the second context parameter 214, as well as the inclusion parameter of the second context parameter 214 into the first context parameter 212 is below the pre-determined threshold. As such, the lexical unit relation generating routine 210 is configured to execute the non-hierarchical link analysis with regards to the first lexical unit 312 and the second lexical unit 314 (described below).

In another example, it may be determined that the inclusion parameter of the first context parameter 212 into the third context parameter 216 is below the pre-determined threshold, but the inclusion parameter of the third context parameter 216 into the first context parameter 212 is above the pre-determined threshold. As such, the lexical unit relation generating routine 210 is configured to execute the hierarchical link analysis with regards to the first lexical unit 312 and the third lexical unit 316 (described below).

Non-Hierarchical Link Analysis

Figure 9A:
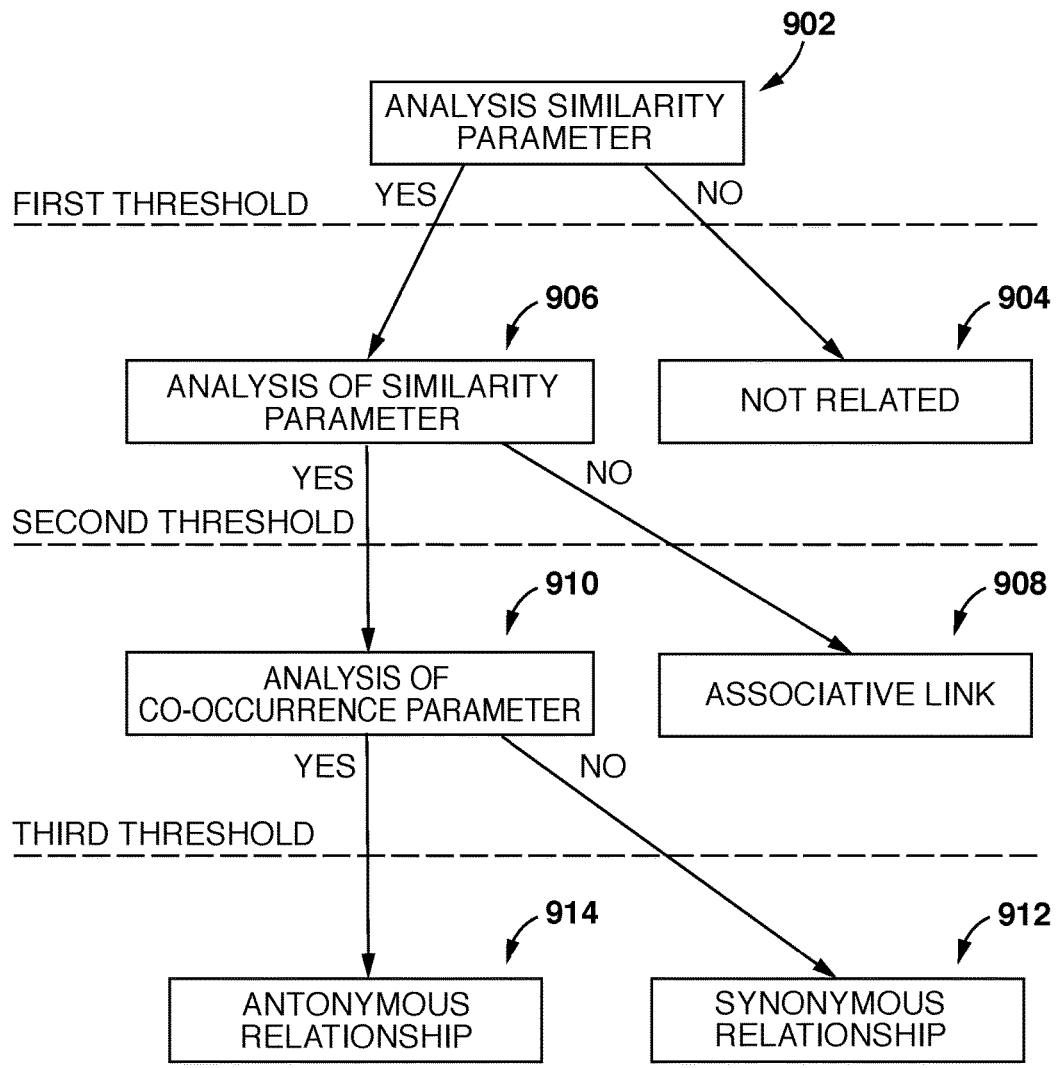
FIG. 9A depicts a flowchart of determining a non-hierarchical semantic link between two lexical units based on the similarity parameter of FIG. 7.

FIG. 9A illustrates a non-limiting embodiment of a process of executing the non-hierarchical analysis to determine whether the non-hierarchical link is one of an associative link, a synonymous relationship, or an antonymous relationship. As stated previously, the presently explained embodiment is triggered when (i) the inclusion parameter of the first context parameter 212 into the given remaining lexical units; and (ii) the inclusion parameter of the given remaining lexical units into the first context parameter are both below the pre-determined threshold. For ease of explanation, the following process is described with reference to the first context parameter 212 and the second context parameter 214.

At step 902, the lexical unit relation generating routine 210 is configured to analyze the similarity parameter between the first context parameter 212 and the second context parameter 214, which was determined at step 708, and then determine if the similarity parameter is above a first threshold (which may be empirically determined).

If it is determined that the similarity parameter is below the first threshold, the first lexical unit 312 and the second lexical unit 314 is determined to be not related at step 904.

If it is determined that the similarity parameter is above the first threshold, the lexical unit relation generating routine 210 proceeds to step 906. At step 906, the lexical unit relation generating routine 210 is configured to determine if the similarity parameter is above a second threshold (which may be empirically determined).

If it is determined that the similarity parameter is below the second threshold, the semantic link between the first lexical unit 312 and the second lexical unit 314 is determined to be an associative link at step 908.

If it is determined that the similarity parameter is above the second threshold, the lexical unit relation generating routine 210 proceeds to step 910. At step 910, the lexical unit relation generating routine 210 is configured to determine if the co-occurrence parameter of the first lexical unit 312 and the second lexical unit 314 is above a third threshold (which may be empirically determined).

If it is determined that the co-occurrence parameter of the first lexical unit 312 and the second lexical unit 314 is below the third threshold, the lexical unit relation parameter for the first lexical unit 312 and the second lexical unit 314 is determined to be the synonymous relationship at step 912.

On the other hand, if it is determined that the co-occurrence parameter of the first lexical unit 312 and the second lexical unit 314 is above the third threshold, the lexical unit relation parameter for the first lexical unit 312 and the second lexical unit 314 is determined to be the antonymous relationship at step 914.

The lexical unit relation generating routine 210 is further configured to transmit a data packet 220 comprising the determined lexical unit relation parameter with the associated lexical units to the semantic relationship database 124 to populate the digital thesaurus stored therein.

Hierarchical Link Analysis

Figure 9B:
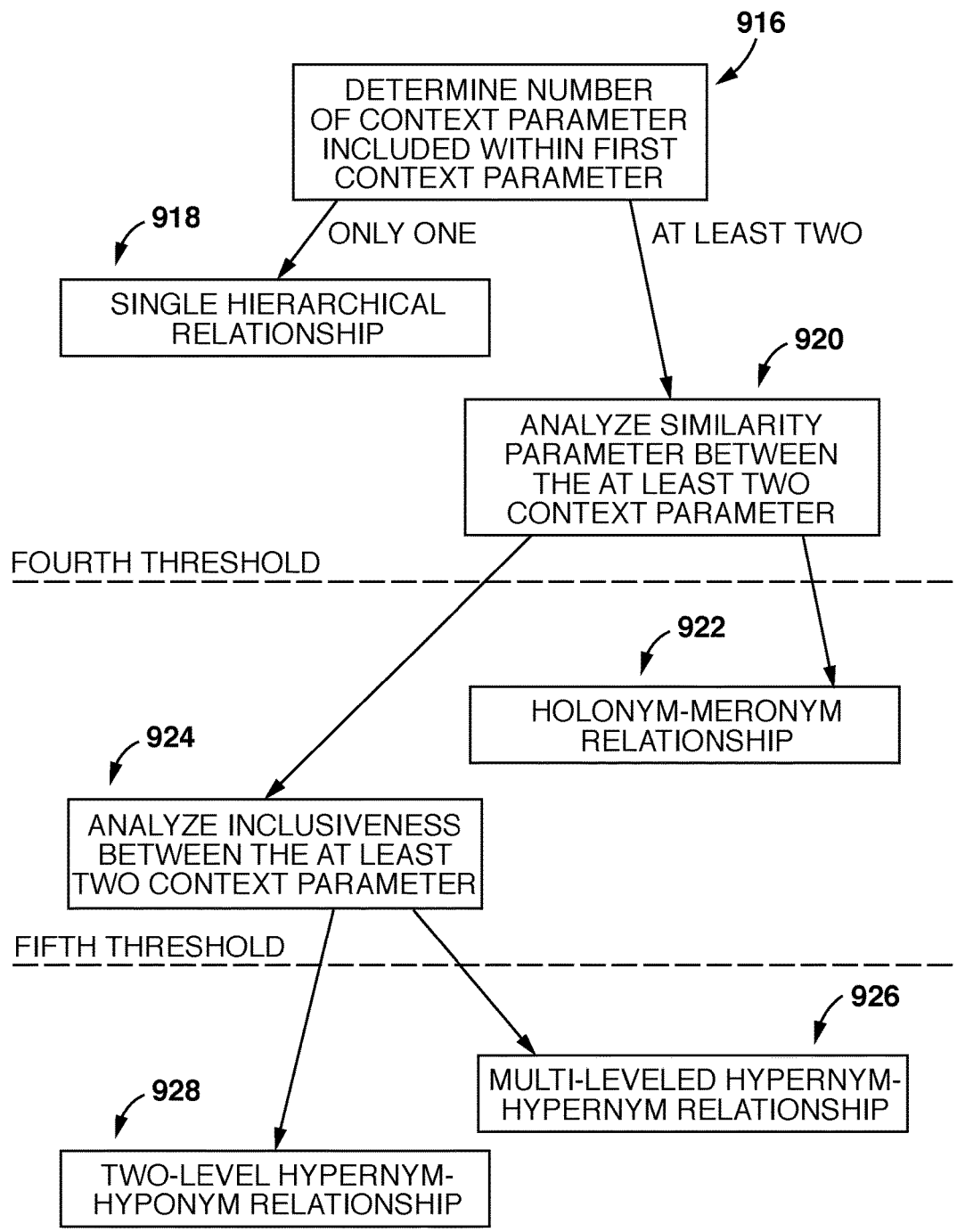
FIG. 9B depicts a flowchart of determining a hierarchical semantic link between two or more lexical units based on the similarity parameter of FIG. 7 and the inclusion parameter of FIG. 8.

FIG. 9B illustrates a non-limiting embodiment of a process of the hierarchical analysis to determining whether the hierarchical link is one of a hypernym-hyponym relationship, or a holonym-meronym relationship. As stated previously, the presently explained embodiment is triggered when at least one of when (i) the inclusion parameter of the first context parameter 212 into the given remaining lexical units; and (ii) the inclusion parameter of the given remaining lexical units into the first context parameter is determined to be above the pre-determined threshold. For ease of explanation, the following process is described assuming that the inclusion parameter of a given context parameter (either one of, or both the second context parameter 214 and the third context parameter 216) into the first context parameter 212 is above the pre-determined threshold. For the avoidance of doubt, although the reference numerals are in continuation from the reference numerals used in reference to explain the process of FIG. 9A, the presently explained non-limiting embodiment is different.

The present embodiment starts at step 916, where the lexical unit relation generating routine 210 is configured to identify how many inclusion parameters from the remaining lexical units into the first context parameter 212 were determined to be above the pre-determined threshold.

For example, if it is determined that only the inclusion parameter of the second context parameter 214 into the first context parameter 212 is above the pre-determined threshold, the process proceeds to step 918, where it is determined that the first lexical unit 312 and the second lexical unit 314 is a single hierarchical relationship. In some embodiments, the single hierarchical relationship is a hypernym-hyponym relationship. In this case, since the second context parameter 214 is included within the first context parameter 212, the first lexical unit 312 would be the hypernym and the second lexical unit 314 would be the hyponym. Alternatively, the lexical unit relation generating routine 210 is configured to determine whether the co-occurrence parameter associated with the first source lexical unit 312 and the second lexical unit 314 is above another pre-determined threshold (which may be empirically determined). If it is determined that the co-occurrence parameter is above the other threshold, the single hierarchical relationship is a holonym-meronym relationship.

On the other hand, if it is determined that in addition to the inclusion parameter of the second context parameter 214 into the first context parameter 212, there is also the inclusion parameter of the third context parameter 214 into the first context parameter 212 being above the pre-determined threshold, the process proceeds to step 920.

Continuing with the above example, the lexical unit relation generating routine 210 is configured to determine whether the similarity parameter between the second context parameter 214 and the third context parameter 216 is above a fourth threshold (which may be empirically determined).

If it is determined that the similarity parameter between the second context parameter 214 and the third context parameter 216 is below the fourth threshold, the process proceeds to step 922, where it is determined that the first lexical unit 312, the second lexical unit 314 and the third lexical unit 316 is a holonym-meronym relationship. For example, a determination of the holonym-meronym relationship would occur in a situation where the first lexical unit 314 is the word "wing", the second lexical unit 314 is the word "bird", and the third lexical unit 316 is the word "airplane": the first lexical unit 312 is a meronym of the second lexical unit 314 and the third lexical unit 316 which are holonyms.

If it is determined that the similarity parameter between the second context parameter 214 and the third context parameter 216 is above the fourth threshold, the lexical unit relation generating routine 210 proceeds to step 924. At step 924, the lexical unit relation generating routine 210 is configured to determine whether one of (i) the inclusion parameter of the second context parameter 214 into the third context parameter 216; and (ii) the inclusion parameter of the third context parameter 216 into the second context parameter 214 is above a fifth threshold.

For example, if it is determined that the inclusion parameter of the third context parameter 216 into the second context parameter 214 is above the fifth threshold, the process proceeds to step 926, where it is determined that the first lexical unit 312, the second lexical unit 314 and the third lexical unit 316 is a multi-leveled hypernym-hyponym relationship. In other words, the third lexical unit 316 would be hyponym of the second lexical unit 314, which would be the hyponym of the first lexical unit 312 (which is the hypernym).

If it is determined that the inclusion parameter of the third context parameter 216 into the second context parameter 214 (and conversely the inclusion parameter of the second context parameter 214 into the third context parameter 216), the process proceeds to step 928, where it is determined that the first lexical unit 312, the second lexical unit 314 and the third lexical unit 316 is a two-level hypernym-hyponym relationship. In other words, the first lexical unit 316 would be a hyponym, whereas both the second lexical unit 314 and the third lexical unit 318 would be a hypernym.

The lexical unit relation generating routine 210 is further configured to transmit a data packet 220 comprising the determined lexical unit relation parameter with the associated lexical units to the semantic relationship database 124 to populate the digital thesaurus stored therein.

Needless to say, although the present technology has been described using three lexical units (the first lexical unit 312, the second lexical unit 314, and the third lexical unit 316) from a single digital text (the digital text 302), this was merely done so for ease of understanding and is not intended to be limitative. It would be obvious to a person skilled in the art that in order to properly populate the thesaurus, a large number of lexical units as well as a large number of digital texts will be required.

Use of the Digital Thesaurus

As stated previously, in some embodiments, the search engine server 118 is configured to modify the search query using the digital thesaurus hosted in the semantic relationship database 124.

Generally speaking, when the search engine server 118 receives the search query, the search engine server 118 is configured to access the index 120 and retrieve an indication of a plurality of crawled network resources that are potentially relevant to the submitted search query.

In some embodiments, prior to retrieving the indication of the plurality of crawled network resources that are potentially relevant to the submitted search query, the search engine server 118 is configured to generate one or more altered queries using the digital thesaurus.

In an embodiment, the search engine server 118 is configured to parse the search query and generate a first altered query using synonymous words or phrases identified in the digital thesaurus.

In another embodiment, the search engine server 118 is configured to parse the search query and generate a second altered query using a holonym (or hypernym) associated with one or more search query words or phrases to broaden the scope of the potentially relevant network resources.

In yet another embodiment, the search engine server 118 is configured to parse the search query and identify one or more antonyms (as word or phrase) associated with one or more search query words. Using the identified antonyms, the search engine server 118 may be configured to filter or rank the so-retrieved potentially relevant network resources.

In yet another embodiment, the search engine server 118 is configured to parse the search query and identify one or more words/phrases that are in associative link with one or more search query words/phrases. Using the identified one or more words/phrases that are in associative link, the search engine server 118 may be configured to generate a third altered query to identify network resources that are indirectly relevant to the received search query.

Once the search engine server 118 retrieves a plurality of network resources based on the one or more above mentioned altered queries (as well as the original search query), the search engine server 118 is further configured to rank (via the ranking application 128) the so-retrieved potentially relevant network resources so that they can be presented in a ranked order on the SERP, such that the SERP presents so-ranked more relevant resources at the top portion of the list.

Figure 10:
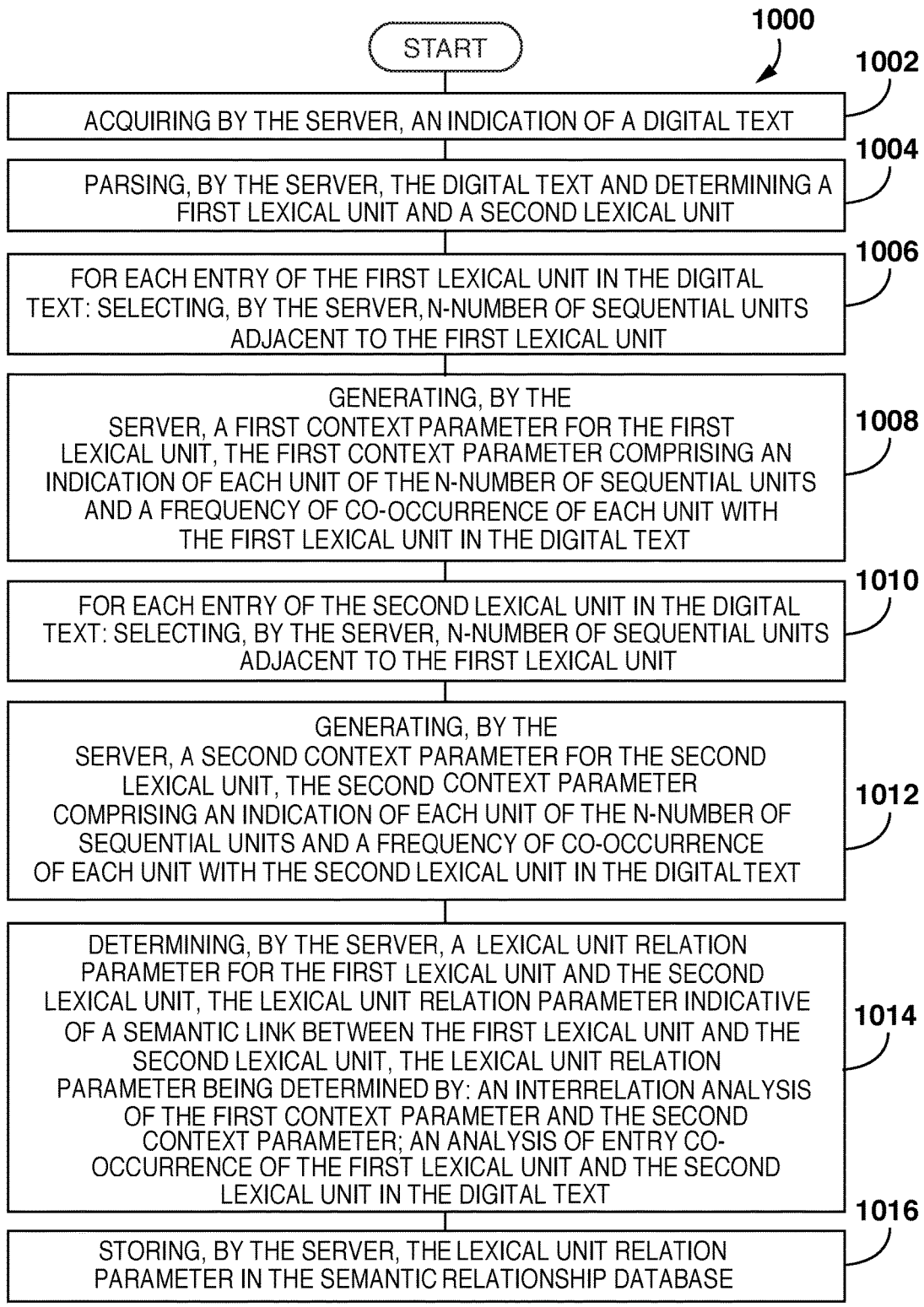
FIG. 10 depicts a flow chart of a method of an automatic generation of a thesaurus being executable by the search engine server of FIG. 1, the method being executed in accordance with non-limiting embodiments of the present technology.

Given the architecture and examples provided herein above, it is possible to execute a computer-implemented method of automatic generation of a digital thesaurus. With reference to FIG. 10, there is depicted a flow chart of a method 1000, the method 1000 being executable in accordance with non-limiting embodiments of the present technology. The method 1000 can be executed by the search engine server 118.

Step 1002—acquiring by the server, an indication of a digital text

The method 1000 starts at step 1102, where the text processing application 126 executed by the search engine server 118 acquires an indication of the digital text 302 via the text acquiring routine 202.

In some embodiment, the digital text 302 is acquired from a dedicated source, such as a database coupled to the search engine server 118 comprising at least one training digital document or from the index 120, in which case the digital text 302 is the textual portion of one or more crawled network resource.

Step 1004—parsing, by the server, the digital text and determining a first lexical unit and a second lexical unit At step 1004, the parsing routine 204 of the text processing application 126 parses the plurality of sentences 304 into one or more individual sentences, such as the first sentence 306, the second sentence 308 and the third sentence 310.

The lexical unit determination routine 206 of the text processing application 126 is further configured to select the first lexical unit 312 and the second lexical unit 314.

Step 1006—for each entry of the first lexical unit in the digital text: selecting, by the server, n-number of sequential units adjacent to the first lexical unit At step 1006, the lexical unit determination routine 206 is configured to identify the n-number of sequential units adjacent to the first lexical unit 314 for each entry of the first lexical unit 314 in the digital text 302.

Step 1008—generating, by the server, a first context parameter for the first lexical unit, the first context parameter comprising an indication of each unit of the n-number of sequential units and a frequency of co-occurrence of each unit with the first lexical unit in the digital text At step 1008, the context parameter generating routine 208 is configured to generate a first context parameter 212 for the first lexical unit 314. The first context parameter 212 comprises an indication of each unit of each n-number of sequential units identified by the lexical unit determination routine 206, and a frequency of co-occurrence of a given unit with the first lexical unit 314 in the digital text 302.

Step 1010—for each entry of the second lexical unit in the digital text: selecting, by the server, n-number of sequential units adjacent to the second lexical unit At step 1010, the lexical unit determination routine 206 is configured to identify the n-number of sequential units adjacent to the second lexical unit 316 for each entry of the second lexical unit 316 in the digital text 302.

Step 1012—generating, by the server, a second context parameter for the second lexical unit, the second context parameter comprising an indication of each word of the n-number of sequential units and a frequency of co-occurrence of each unit with the second lexical unit in the digital text At step 1012, the context parameter generating routine 208 is configured to generate a second context parameter 214 for the second lexical unit 316. The second context parameter 214 comprises an indication of each unit of each n-number of sequential units identified by the lexical unit determination routine 206, and a frequency of co-occurrence of a given unit with the second lexical unit 316 in the digital text 302.

Step 1014—determining, by the server, a lexical unit relation parameter for the first lexical unit and the second lexical unit, the lexical unit relation parameter indicative of a semantic link between the first lexical unit and the second lexical unit, the lexical unit relation parameter being determined by: an interrelation analysis of the first context parameter and the second context parameter; an analysis of entry co-occurrence of the first lexical unit and the second lexical unit in the digital text At step 1014, the lexical unit relation generating routine 210 is configured to execute, concurrently or sequentially an interrelation analysis of the first context parameter 212 and the second context parameter 214 as well as an analysis of entry-co-occurrence amongst the first lexical unit 312 and the second lexical unit 314 within the digital text 302.

Based on the interrelation analysis and the entry co-occurrence analysis, the lexical unit relation generating routine 210 is configured to generate the lexical unit relation parameter indicative of a semantic link between the first lexical unit 312 and the second lexical unit 314.

In some embodiments, the semantic link may be one of a non-hierarchical link (being one of synonymous relationship, or an antonymous relationship), a hierarchical link (being one of a hypernym-hyponym relationship, or a holonym-meronym relationship), and an associative link.

Step 1016—storing, by the server, the lexical unit relation parameter into the semantic relationship database At step 1016, the lexical unit relation generating routine 210 is further configured to transmit the data packet 220 comprising an indication of the first lexical unit 314 and the second lexical unit 316 along with the determined lexical unit relation parameter to the semantic relationship database 124 to populate the digital thesaurus stored therein.

It should be expressly understood that although the implementation of the digital thesaurus has been explained with respect to an information retrieval environment, it is merely done so for ease of understanding and is no way intended to be limitative. As a person skilled in the art would know, the generated digital thesaurus may be used for other purposes, such identifying relevant ads in an information retrieval environment, text-to-speech process, machine translations and the like.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

It should be expressly understood that not all technical effects mentioned herein need to be enjoyed in each and every implementation of the present technology. For example, implementations of the present technology may be implemented without the user enjoying some of these technical effects, while other implementations may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is indented to be exemplary rather than limiting. The scope of the present technology is therefore intended to be limited solely by the scope of the appended claims.

The invention claimed is:

1. A method of automatic generation of a digital thesaurus, the method executable by a server coupled to a semantic relationship database, the method comprising:
   acquiring by the server, an indication of a digital text, the digital text comprising one or more sentences;
   parsing, by the server, the digital text and determining a first lexical unit and a second lexical unit;
   for each entry of the first lexical unit in the digital text:
      selecting, by the server, n-number of sequential units adjacent to the first lexical unit;
   generating a first plurality of unit-pairs, the first plurality of unit-pairs comprising the first lexical unit paired with each unit of the n-number of sequential units adjacent to the first lexical unit;
   generating, by the server, a first context parameter for the first lexical unit, the first context parameter comprising a frequency of co-occurrence of each unit-pair of the first plurality of unit-pairs within the one or more sentences of the digital text;
   for each entry of the second lexical unit in the digital text:
      selecting, by the server, n-number of sequential units adjacent to the second lexical unit;
   generating a second plurality of unit-pairs, the second plurality of unit-pairs comprising the second lexical unit paired with each unit of the n-number of sequential units adjacent to the second lexical unit;
   generating, by the server, a second context parameter for the second lexical unit, the second context parameter comprising a frequency of co-occurrence of each unit-pair of the second plurality of unit-pairs within the one or more sentences of the digital text;
   determining, by the server, a lexical unit relation parameter for the first lexical unit and the second lexical unit, the lexical unit relation parameter indicative of a semantic link between the first lexical unit and the second lexical unit, the lexical unit relation parameter being determined by:
      an interrelation analysis of the first context parameter and the second context parameter, the interrelation analysis comprising:
         determining a first inclusion parameter indicative of the inclusion of the first context parameter into the second context parameter;
         determining a second inclusion parameter indicative of the inclusion of the second context parameter into the first context parameter;
         determining a first similarity parameter between the first context parameter and the second context parameter;
      an analysis of entry co-occurrence of the first lexical unit and the second lexical unit in the digital text, the analysis of entry co-occurrence comprising:
         determining a co-occurrence parameter indicative of a frequency of the first lexical unit and the second lexical unit being contained within a same sentence of the digital text;
   wherein, upon determination that the first inclusion parameter and the second inclusion parameter are below a first threshold, the lexical unit relation parameter is indicative of:
      a synonymous relationship if the first similarity parameter is above a second threshold and the co-occurrence parameter is below a third threshold;

an antonymous relationship if the first similarity parameter is above a fourth threshold and the co-occurrence parameter is above a fifth threshold;
an associative link if the first similarity parameter is below a sixth threshold; and
storing, by the server, the lexical unit relation parameter in the semantic relationship database.

2. The method of claim 1, further comprising associating a grammatical type to each word of the digital text before determining the first lexical unit and the second lexical unit.

3. The method of claim 2, wherein the lexical unit is one of:
a word, the word being determined based on its associated grammatical type; and
a phrase, the phrase being a group of two or more words determined based on the associated grammatical type of one of the two or more words.

4. The method of claim 3, further comprising lemmatizing the first and second lexical units and the words of the digital text before determining the frequency of co-occurrence.

5. The method of claim 1, wherein the n-number of sequential units are at least one of sequentially preceding, sequentially following, or sequentially preceding and following the first and second lexical unit, respectively.

6. The method of claim 1, wherein the analysis of entry co-occurrence comprises determining a co-occurrence parameter indicative of a frequency of the first lexical unit and the second lexical unit being contained within a same sentence of the digital text.

7. The method of claim 1, wherein the lexical unit relation parameter for the first and second lexical unit is indicative of a hypernym-hyponym relationship if one of the first inclusion parameter or the second inclusion parameter is above a threshold.

8. The method of claim 6, wherein the interrelation analysis further comprises:
further parsing the digital text, by the server, to determine a third lexical unit;
for each entry of the third lexical unit in the text:
selecting, by the server, n-number of sequential units adjacent to the third lexical unit;
generating a third plurality of unit-pairs, the third plurality of unit-pairs comprising the third lexical unit paired with each unit of the n-number of sequential units adjacent to the third lexical unit;
generating, by the server, the third context parameter for the third lexical unit, the third context parameter comprising a frequency of co-occurrence of each unit-pairs of the third plurality of unit-pairs within the one or more sentences of the digital text; and
determining a second similarity parameter of the third context parameter with the second context parameter.

9. The method of claim 8, wherein the lexical unit relation parameter for the first, the second and third lexical unit is indicative of the holonym-meronym relationship if the first inclusion parameter and the second inclusion parameter is above a seventh threshold, and the second similarity parameter is below a eight threshold.

10. A server for automatic generation of a digital thesaurus, the server comprising:
a network interface for communicatively coupling to a communication network;
a processor coupled to the network interface, the professor configured to:
acquire by the server, an indication of a digital text, the digital text comprising one or more sentences;
parse, by the server, the digital text and determining a first lexical unit and a second lexical unit;
for each entry of the first lexical unit in the digital text:
select, by the server, n-number of sequential units adjacent to the first lexical unit;
generate a first plurality of unit-pairs, the first plurality of unit-pairs comprising the first lexical unit paired with each unit of the n-number of sequential units;
generate, by the server, a first context parameter for the first lexical unit, the first context parameter comprising a frequency of co-occurrence of each unit-pair within the digital text;
for each entry of the second lexical unit in the digital text:
select, by the server, n-number of sequential units adjacent to the second lexical unit;
generate a second plurality of unit-pairs, the second plurality of unit-pairs comprising the second lexical unit paired with each unit of the n-number of sequential units adjacent to the second lexical unit;
generate, by the server, a second context parameter for the second lexical unit, the second context parameter comprising a frequency of co-occurrence of each unit-pair within the one or more sentences of the digital text;
determine, by the server, a lexical unit relation parameter for the first lexical unit and the second lexical unit, the lexical unit relation parameter indicative of a semantic link between the first lexical unit and the second lexical unit, the lexical unit relation parameter being determined by:
an interrelation analysis of the first context parameter and the second context parameter, the interrelation analysis comprising:
determining a first inclusion parameter indicative of the inclusion of the first context parameter into the second context parameter;
determining a second inclusion parameter indicative of the inclusion of the second context parameter into the first context parameter;
determining a first similarity parameter between the first context parameter and the second context parameter;
an analysis of entry co-occurrence of the first lexical unit and the second lexical unit in the digital text, the analysis of entry co-occurrence comprising:
determining a co-occurrence parameter indicative of a frequency of the first lexical unit and the second lexical unit being contained within a same sentence of the digital text;
wherein, upon determination that the first inclusion parameter and the second inclusion parameter are below a first threshold, the lexical unit relation parameter is indicative of:
a synonymous relationship if the first similarity parameter is above a second threshold and the co-occurrence parameter is below a third threshold:
an antonymous relationship if the first similarity parameter is above a fourth threshold and the co-occurrence parameter is above a fifth threshold:
an associative link if the first similarity parameter is below a sixth threshold; and
store, by the server, the lexical unit relation parameter in the semantic relationship database.

11. The server of claim 10, further configured to lemmatize the first and second lexical units and the words of the digital text before determining the frequency of co-occurrence.

12. The server of claim 10, wherein the n-number of sequential units are at least one of sequentially preceding, sequentially following, or sequentially preceding and following the first and second lexical unit, respectively.

13. The server of claim 12, wherein upon determining that the n-number of sequential units adjacent to a given occurrence of the first lexical unit spans into an additional sentence adjacent thereto, the processor is configured to generate a respective first context parameter associated with the given occurrence comprises using a subset of the n-number of sequential units, the subset being units from the sentence of the given occurrence.

14. The server of claim 13, wherein:
  prior to determining the n-n-number of sequential units, further configured to associate a grammatical type to each word of the digital text; and
  wherein the n-number of sequential units are of a predetermined grammatical type.

15. The server of claim 10, wherein the interrelation analysis comprises one of:
  determining a third inclusion parameter of the first context parameter into a third context parameter, wherein the third context parameter is determined by:
    further parsing the digital text, by the server, to determine a third lexical unit;
    for each entry of the third lexical unit in the text:
      selecting, by the server, n-number of sequential units adjacent to the third lexical unit;
    generating a third plurality of unit-pairs, the third plurality of unit-pairs comprising the third lexical unit paired with each unit of the n-number of sequential units adjacent to the third lexical unit;
    generating, by the server, the third context parameter for the third lexical unit, the third context parameter comprising a frequency of co-occurrence of each unit-pairs of the third plurality of unit-pairs within the one or more sentences of the digital text; and
  determining a second similarity parameter between the third context parameter and the second context parameter.

16. The server of claim 15, wherein:
upon determination that the first inclusion parameter is above the first threshold, the lexical unit relation parameter for the first and second lexical unit is:
  a hypernym-hyponym relationship if the inclusion parameter is above a seventh threshold; and
upon determination that the first inclusion parameter and the third inclusion parameter are above a eight threshold, the lexical unit relation parameter for the first, second and third lexical unit is:
  a holonym-meronym relationship if the second similarity parameter is below a ninth threshold.

\* \* \* \* \*